(12) United States Patent
Smith

(10) Patent No.: US 11,903,379 B2
(45) Date of Patent: Feb. 20, 2024

(54) SYSTEM AND METHOD FOR PERFORMING SPRAYING OPERATIONS WITH AN AGRICULTURAL SPRAYER

(71) Applicant: CNH Industrial America LLC, New Holland, PA (US)

(72) Inventor: Kevin M. Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 443 days.

(21) Appl. No.: 17/114,733

(22) Filed: Dec. 8, 2020

(65) Prior Publication Data

US 2022/0174933 A1 Jun. 9, 2022

(51) Int. Cl.
| | | |
|---|---|---|
| A01M 7/00 | (2006.01) | |
| B05B 1/20 | (2006.01) | |
| B05B 12/12 | (2006.01) | |

(52) U.S. Cl.
CPC ........ *A01M 7/0089* (2013.01); *A01M 7/0042* (2013.01); *A01M 7/0075* (2013.01); *B05B 1/205* (2013.01); *B05B 12/122* (2013.01); *A01M 7/0071* (2013.01)

(58) Field of Classification Search
CPC .............. A01M 7/0042; A01M 7/0071; A01M 7/0075; A01M 7/0089; B05B 1/20; B05B 1/205; B05B 12/12; B05B 12/122
See application file for complete search history.

(56) References Cited

U.S. PATENT DOCUMENTS

| | | | |
|---|---|---|---|
| 4,823,268 A | 4/1989 | Giles et al. | |
| 9,339,023 B2 | 5/2016 | Ballu | |
| 9,745,060 B2 | 8/2017 | O'Connor et al. | |
| 10,255,670 B1 | 4/2019 | Wu et al. | |
| 2013/0204437 A1 | 8/2013 | Koselka et al. | |
| 2014/0001276 A1 | 1/2014 | Joergensen et al. | |

(Continued)

FOREIGN PATENT DOCUMENTS

| | | |
|---|---|---|
| CN | 103918636 B | 7/2014 |
| DE | 202014002338 U1 | 5/2014 |

OTHER PUBLICATIONS

Sharon O'Keeffe, "Amazone AmaSelect Nozzle Technology Used with DroneWerkers Weed Map," Farm Online, Australia, dated Nov. 28, 2019, (7 pages) https://www.farmonline.com.au/story/6516203/amazone-unveil-smart-spray-drone/.

*Primary Examiner* — Darren W Gorman
(74) *Attorney, Agent, or Firm* — Rebecca L. Henkel; Rickard K. DeMille

(57) ABSTRACT

A method for performing spraying operations includes monitoring a field condition of a first swath based on data received from a sensor as an agricultural sprayer makes a first pass across a field, the sensor being associated with a first boom section assembly extending over the first swath during the first pass. The method further includes controlling a nozzle assembly as the sprayer makes a second pass across the field to perform a spraying operation along the first swath based on the monitored field condition of the first swath, the nozzle assembly being associated with a second boom section assembly extending over the first swath during the second pass. Additionally, the method includes monitoring a field condition of a second swath based on data received from the sensor as the sprayer makes the second pass across the field.

20 Claims, 11 Drawing Sheets

(56) References Cited

U.S. PATENT DOCUMENTS

| | | | |
|---|---|---|---|
| 2017/0359943 A1 | 12/2017 | Calleija et al. | |
| 2018/0111148 A1 | 4/2018 | Batcheller et al. | |
| 2018/0279599 A1* | 10/2018 | Struve | G09B 29/106 |
| 2019/0126308 A1* | 5/2019 | Hendrickson | B05B 1/20 |
| 2019/0150357 A1 | 5/2019 | Wu et al. | |
| 2019/0351434 A1* | 11/2019 | Smith | B05B 12/124 |
| 2020/0045953 A1 | 2/2020 | Serrat et al. | |
| 2020/0230633 A1* | 7/2020 | Serrat | G06V 20/56 |
| 2021/0007344 A1* | 1/2021 | Fisher | B05B 1/20 |
| 2021/0127567 A1* | 5/2021 | Loukili | A01M 7/0089 |
| 2021/0378228 A1* | 12/2021 | Klemann | A01M 7/006 |
| 2022/0132828 A1* | 5/2022 | Kwak | G06T 7/0004 |
| | | | 701/50 |
| 2022/0132829 A1* | 5/2022 | Kwak | B05B 12/122 |
| | | | 239/11 |
| 2022/0138464 A1* | 5/2022 | Kwak | G06V 20/56 |
| | | | 239/1 |

* cited by examiner

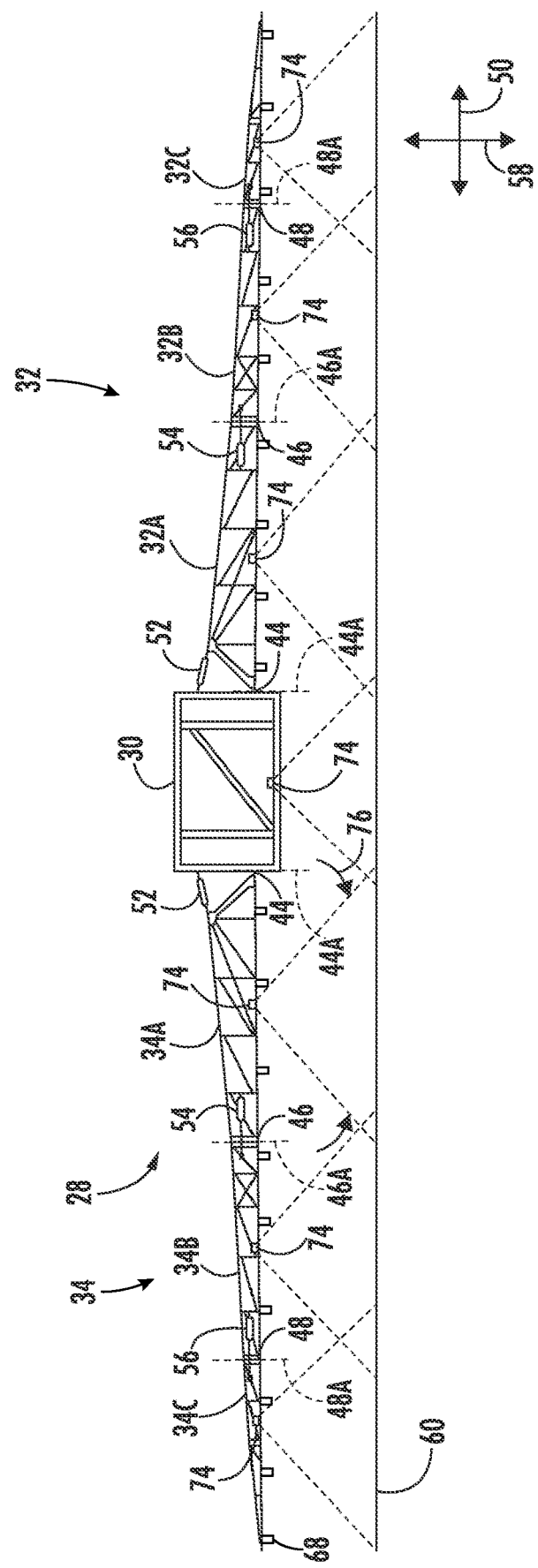

SYSTEM AND METHOD FOR PERFORMING SPRAYING OPERATIONS WITH AN AGRICULTURAL SPRAYER

FIELD OF THE INVENTION

The present disclosure relates generally to agricultural sprayers and, more particularly, to sensor systems for agricultural sprayers and related methods for performing spraying operations with an agricultural sprayer.

BACKGROUND OF THE INVENTION

Agricultural sprayers apply an agricultural substance (e.g., a pesticide, a nutrient, and/or the like) onto crops and/or a ground surface as the sprayer is traveling across a field. To facilitate such travel, sprayers are configured as self-propelled vehicles or implements towed behind an agricultural tractor or other suitable work vehicle. A typical sprayer includes an outwardly-extending boom assembly having a plurality of boom sections supporting a plurality of spaced apart nozzle assemblies. Each nozzle assembly has a valve configured to control the spraying of the agricultural substance through a nozzle onto underlying crops and/or weeds. The boom assembly is disposed in a "floating" arrangement during the spraying operation, wherein the boom sections are extended to cover wide swaths of the field. For transport, the boom assembly is folded to reduce the width of the sprayer.

Some sprayers may control the flow of agricultural substance through individual nozzles based on data received from sensors mounted on the boom sections that detect one or more field conditions (e.g., weeds, moisture content, etc.). Such sensors are typically fixed relative to the respective boom sections on which they are supported. However, the speed at which the sprayer may make passes through the field is limited by the sensing and processing speeds for monitoring the field conditions relative to the boom. Previous applications have attempted to account for such issue by extending the sensors above or below the respective boom sections to allow the sensors to detect field conditions further in front of the boom, however, such mounting of the sensors may cause the sensors to collide with other boom sections when the boom assembly is moved between its folded and unfolded orientations.

Accordingly, an improved system and method for performing spraying operations with an agricultural sprayer based on sensed field conditions would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for performing spraying operations. The method includes monitoring, with a computing device, a field condition of a first swath within a field based at least in part on data received from a sensor as an agricultural sprayer makes a first pass across the field. The agricultural sprayer includes a first boom section assembly and a second boom section assembly extending therefrom, where the first boom section assembly extends above at least a portion of the first swath during the first pass, and where the sensor is provided in association with the first boom section assembly. The method further includes controlling, with the computing device, one or more nozzle assemblies of the agricultural sprayer as the agricultural sprayer makes a second pass across the field to perform a spraying operation along the first swath based at least in part on the monitored field condition of the first swath, where the one or more nozzle assemblies are provided in association with the second boom section assembly. Additionally, the method includes monitoring, with the computing device, a field condition of a second swath within the field based on data received from the sensor as the agricultural sprayer makes the second pass across the field, where the first boom section assembly extends above at least a portion of the second swath during the second pass.

In another aspect, the present subject matter is directed to a system for performing spraying operations. The system includes a sprayer boom including a first boom section assembly extending outwardly along a first side of the sprayer boom, and a second boom section assembly extending outwardly along a second side of the sprayer boom, where the second side is opposite the first side. The system further includes a sensor provided in association with the first boom section assembly, the sensor being configured to detect a parameter indicative of a field condition within a portion of the field. Moreover, the system includes one or more nozzle assemblies provided in association with the second boom section assembly. Additionally, the system includes a controller communicatively coupled to the sensor. The controller includes a processor and a memory, the memory being configured to store instructions that, when executed by the processor, configure the controller to monitor the field condition of a first swath based at least in part on sensor data received from the sensor as an agricultural sprayer makes a first pass within the field. The instructions further configure the controller to control the one or more nozzle assemblies as the agricultural sprayer makes a second pass across the field to perform a spraying operation within the first swath based at least in part on the monitored field condition of the first swath. Additionally, the instructions configure the controller to monitor the field condition of a second swath based at least in part on sensor data received from the sensor as the agricultural sprayer makes the second pass.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3 illustrates a front view of a boom assembly of an agricultural sprayer in accordance with aspects of the present subject matter;

Figure 1:
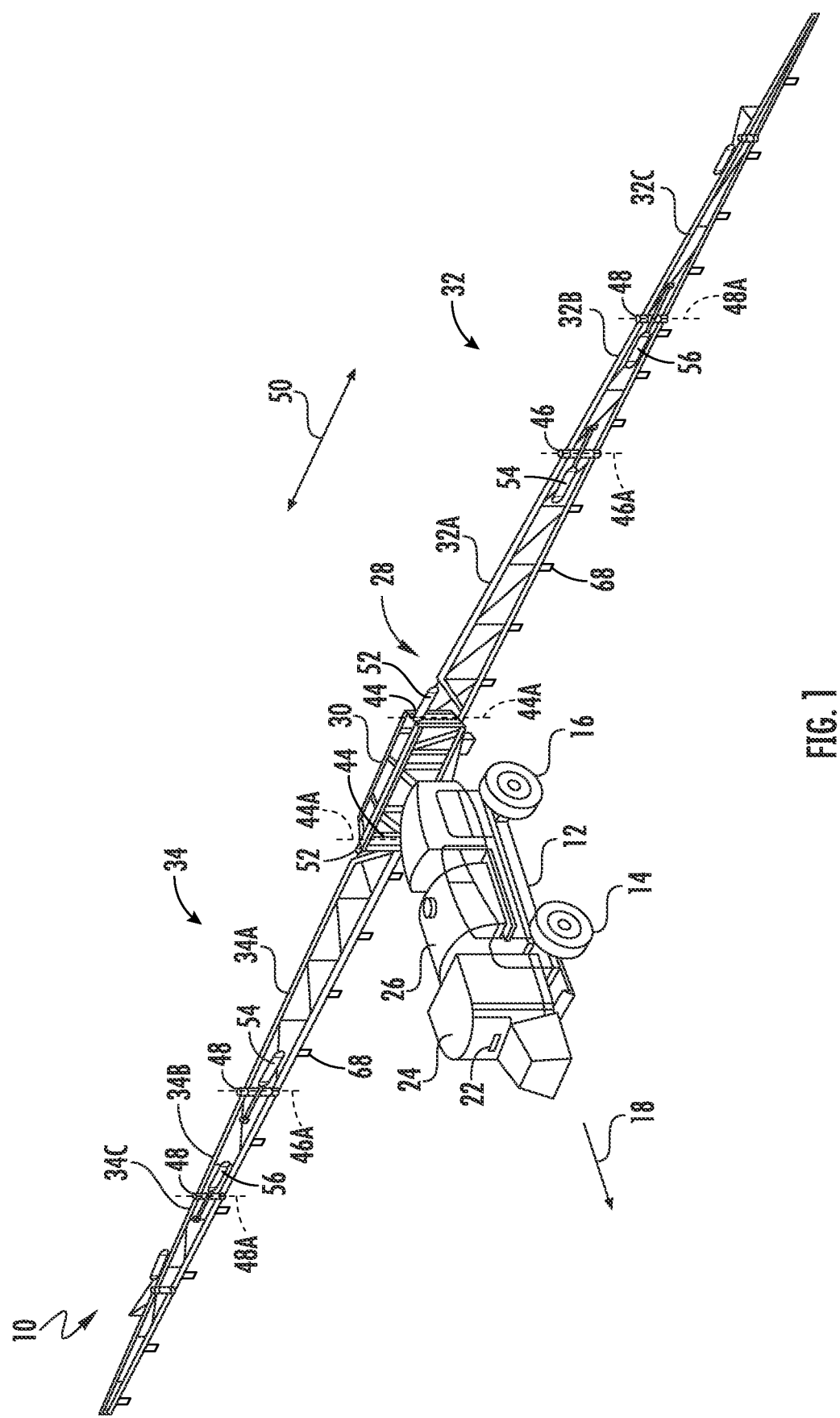
FIG. 1 illustrates a perspective view of one embodiment of an agricultural sprayer in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for performing spraying operations with an agricultural sprayer. Specifically, in several embodiments, one or more sensors may be supported on or otherwise provided in association with one boom assembly extending outwardly from one side of an agricultural sprayer and one or more nozzle assemblies may be supported on or otherwise provided in association with the other boom assembly extending outwardly from an opposite side of the agricultural sprayer. The sensor(s) may detect a parameter(s) indicative of a field condition(s) within a swath above which the associated boom assembly extends. In such embodiments, a controller of the disclosed system may be configured to monitor the field condition(s) within the swath based on the sensor data received from the sensor(s) as the sprayer makes a pass across the field and analyze the sensor data to detect/identify and geo-locate plants within the swath that need to be treated, thereby allowing a treatment or field map to be generated that maps or correlates the identified plants to various locations along the swath. The controller may then actively adjust the operation of the nozzle assemblies associated with the other boom assembly during a subsequent pass to spray the mapped plants. By sensing and mapping the field conditions during a first pass for later nozzle assembly control in a subsequent pass, the sprayer may be driven at a faster speed across the field as the ground speed no longer needs to be limited by the speed required for analyzing/processing the sensor data.

Figure 2:
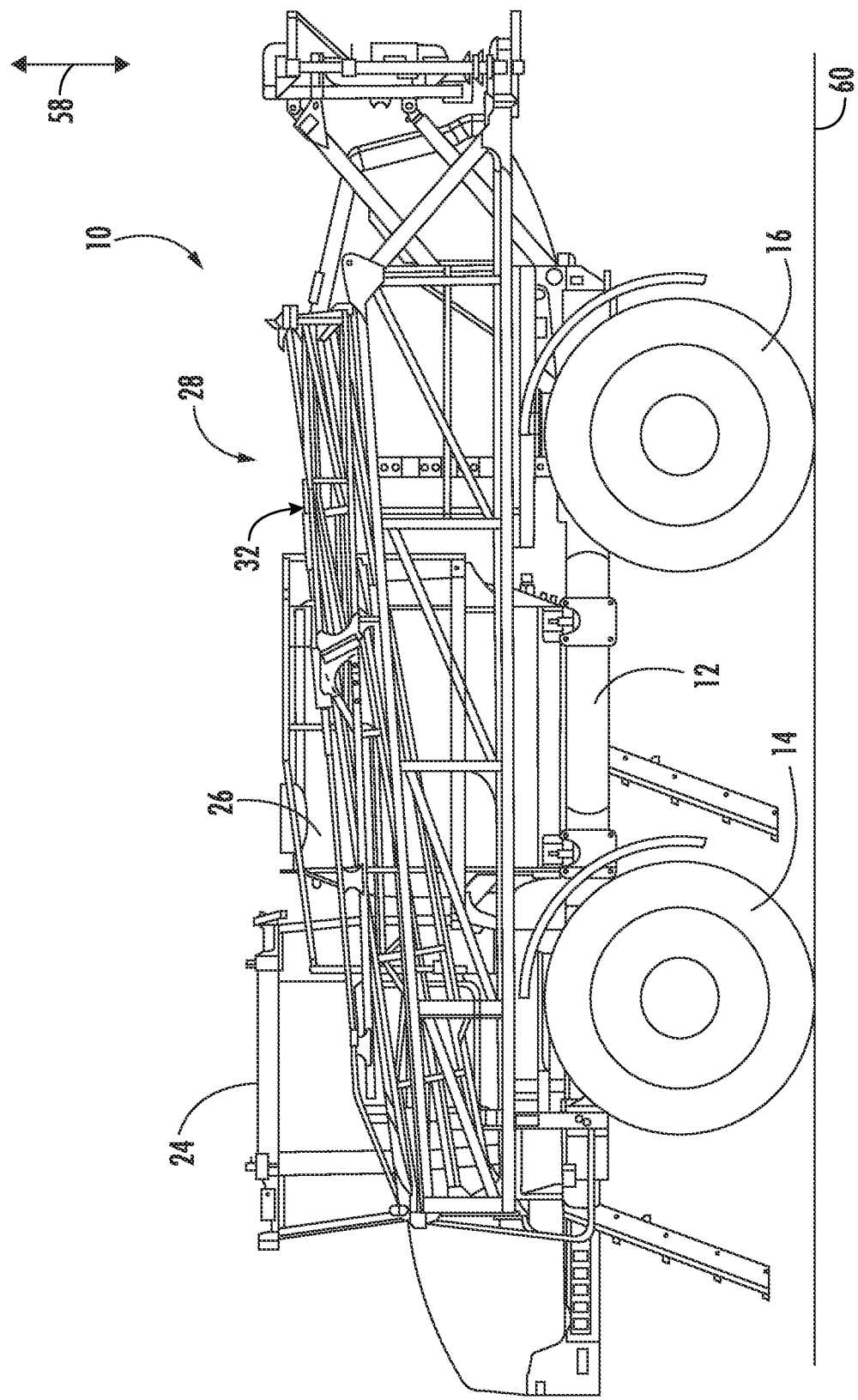
FIG. 2 illustrates a side view of an agricultural sprayer in accordance with aspects of the present subject matter, particularly illustrating the agricultural sprayer in a transport position.

Referring now to FIGS. 1 and 2, differing views of one embodiment of an agricultural sprayer 10 are illustrated in accordance with aspects of the present subject matter. Specifically, FIG. 1 illustrates a perspective view of the sprayer 10 with its boom assembly in a working or unfolded position and FIG. 2 illustrates a side view of the sprayer with its boom assembly in a transport or folded position. In the illustrated embodiment, the agricultural sprayer 10 is configured as a self-propelled agricultural sprayer. However, in alternative embodiments, the agricultural sprayer 10 may be configured as any other suitable type of agricultural sprayer 10 configured to perform agricultural spraying operations, such as a tractor or other vehicle configured to haul a spraying implement.

As shown in FIG. 1, the agricultural sprayer 10 may include a chassis or frame 12 configured to support or couple to a plurality of components. For example, a pair of steerable front wheels 14 (one is shown) and a pair of driven rear wheels 16 (one is shown) may be coupled to the frame 12. The wheels 14, 16 may be configured to support the agricultural sprayer 10 relative to the ground and move the agricultural sprayer 10 in a direction of travel (e.g., as indicated by arrow 18 in FIG. 1) across a field. In this regard, the agricultural sprayer 10 may include an engine (not shown) and a transmission (not shown) configured to transmit power from the engine to the wheels 14, 16. However, it should be appreciated that, in further embodiments, the front wheels 14 of the agricultural sprayer 10 may be driven in addition to or in lieu of the rear wheels 16. The frame 12 may also support an operator's cab 24 that houses various control or input devices (e.g., levers, pedals, control panels, buttons, and/or the like) for permitting an operator to control the operation of the work vehicle 10. For instance, as shown in FIG. 1, the agricultural sprayer 10 may include a user interface 22 for displaying message windows and/or alerts to the operator and/or for allowing the operator to interface with the vehicle's controller. In one embodiment, the user interface 22 may include buttons, knobs and/or any other suitable input devices that allow the operator to provide user inputs to the controller.

Furthermore, the frame 12 may also support one or more tanks 26 and a frame or boom 28 mounted on the frame 12. Each tank 26 is generally configured to store or hold an agricultural product, such as a pesticide, a nutrient, and/or the like. As will be described in greater detail below, a plurality of nozzle assemblies 68 (FIG. 1) mounted on the boom assembly 28 may be configured to selectively dispense the agricultural product stored in an associated tank 26 via nozzles onto the underlying plants and/or soil.

As shown in FIGS. 1 and 2, the boom 28 of the agricultural sprayer 10 may generally be movable between a working or unfolded position (FIG. 1) and a transport or folded position (FIG. 2). In the working position, various sections of the boom 28 are fully extended such that the boom 28 extends over as wide a section of a field as possible. In the transport position, the various sections of the boom 28 are fully retracted to reduce the width of the sprayer 10 for travel. As will be described below, the boom 28 may include a plurality of fold actuators coupled between adjacent boom sections of the boom 28 for moving the boom 28 between the working and transport positions.

As shown in FIG. 1, in one embodiment, the boom 28 includes a central boom section 30, a left boom section assembly 32, and a right boom section assembly 34. The left boom section assembly 32 includes a left inner boom section 32A pivotably coupled to the central boom section 30, a left middle boom section 32B pivotably coupled to the left inner boom section 32A, and a left outer boom section 32C pivotably coupled to the left middle boom section 32B. Similarly, the right boom section assembly 34 includes a right inner boom section 34A pivotably coupled to the central boom section 30, a right middle boom section 34B pivotably coupled to the right inner boom section 34A, and a right outer boom section 34C pivotably coupled to the right middle boom section 34B. Each of the inner boom sections 32A, 34A is pivotably coupled to the central boom section 30 at pivot joints 44. Similarly, the middle boom sections 32B, 34B are pivotally coupled to the respective inner boom sections 32A, 34A at pivot joints 46 while the outer boom sections 32C, 34C are pivotably coupled to the respective middle boom sections 32B, 34B at pivot joints 48.

As is generally understood, pivot joints 44, 46, 48 may be configured to allow relative pivotal motion between adjacent boom sections of the boom 28. For example, the pivot joints 44, 46, 48 may allow for articulation of the various boom sections between a fully extended or working position (e.g., as shown in FIG. 1), in which the boom sections are unfolded along the lateral direction 50 to allow for the performance of an agricultural spraying operation, and a transport position (FIG. 2), in which the boom sections are folded inwardly to reduce the overall width of the boom 28 along the lateral direction 50. It should be appreciated that, although the boom 28 is shown in FIG. 1 as including a central boom section and three individual boom sections coupled to each side of the central boom sections, the boom 28 may generally have any suitable number of boom sections. For example, in other embodiments, each boom section assembly 32, 34 may include four or more boom sections or less than three boom sections.

Additionally, as shown in FIG. 1, the boom 28 may include inner fold actuators 52 coupled between the inner boom sections 32A, 34A and the central boom section 30 to enable pivoting or folding between the fully-extended working position and the transport position. For example, by retracting/extending the inner fold actuators 52, the inner boom sections 32A, 34A may be pivoted or folded relative to the central boom section 30 about a pivot axis 44A defined by the pivot joints 44. Moreover, the boom 28 may also include middle fold actuators 54 coupled between each inner boom section 32A, 34A and its adjacent middle boom section 32B, 34B and outer fold actuators 56 coupled between each middle boom section 32B, 34B and its adjacent outer boom section 32C, 34C. As such, by retracting/extending the middle and outer fold actuators 54, 56, each middle and outer boom section 32B, 34B, 32C, 34C may be pivoted or folded relative to its respective inwardly adjacent boom section 32A, 34A, 32B, 34B about a respective pivot axis 46A, 48A. When moving to the transport position, the boom 28 and fold actuators 52, 54, 56 are typically oriented such that the pivot axes 44A, 46A, 48A are parallel to the vertical direction 58 and, thus, the various boom sections 32A, 34A, 32B, 34B, 32C, 34C of the boom 28 are configured to be folded horizontally (e.g., parallel to the lateral direction 50) about the pivot axes 44A, 46A, 48A to keep the folding height of the boom 28 as low as possible for transport. However, the pivot axes 44A, 46A, 48A may be oriented along any other suitable direction.

Referring now to FIG. 3, a front view of one embodiment of the boom 28 of the agricultural sprayer 10 is illustrated in accordance with aspects of the present subject matter. As shown, in one embodiment, the boom 28 may further include one or more sensors 74 configured to capture data indicative of field conditions within the field. In several embodiments, the sensor(s) 74 may be installed or otherwise positioned on one or more boom sections of the boom 28. For example, as shown in FIG. 3, a sensor 74 may be positioned on each boom section 30, 32A, 34A, 32B, 34B, 32C, 34C of the boom 28. As such, each sensor 74 may have a field of view or detection zone (e.g., as indicated by dashed lines 76 in FIG. 3) directed toward a location underneath and/or in front of the boom 28 relative to the direction of travel 18. In this regard, each sensor 74 may be able to capture data indicative of a field condition(s) within its detection zone 76. For instance, in one embodiment, the sensors 74 are plant detecting/identifying sensors, where the data captured by the sensors 74 is indicative of the location and/or type of plants within the field. More particularly, in one embodiment, the data captured by the sensors 74 may be used to allow weeds to be distinguished from useful plants within the field (e.g., crops). In such instance, as will be described below, the sensor data may, for instance, be used within a spraying operation to selectively spray or treat the detected/identified weeds (e.g., with a suitable herbicide).

It should be appreciated that the sensors 74 may be positioned at any suitable location(s) on and/or coupled to any other suitable component(s) of the agricultural sprayer 10. Furthermore, it should be appreciated that the agricultural sprayer 10 may include any suitable number of sensors 74 and should not be construed as being limited to the number of sensors 74 shown in FIG. 3. For instance, as will be described in greater detail below, in some embodiments, sensors 74 may be positioned on only one side of the boom 28 (e.g., on the left boom section assembly 32). Additionally, it should be appreciated that the sensors 74 may generally correspond to any suitable sensing devices. For example, in one embodiment, each sensor 74 may correspond to any suitable camera(s), such as single-spectrum camera or a multi-spectrum camera configured to capture images, for example, in the visible light range and/or infrared spectral range. Additionally, in a particular embodiment, the camera(s) may correspond to a single lens camera configured to capture two-dimensional images or a stereo camera(s) having two or more lenses with a separate image sensor for each lens to allow the camera(s) to capture stereographic or three-dimensional images. Alternatively, the sensors 74 may correspond to any other suitable image capture device(s) and/or other vision sensor(s) capable of capturing "images" or other image-like data of the field. For example, the sensors 74 may correspond to or include radio detection and ranging (RADAR) sensors and/or light detection and ranging (LIDAR) sensors.

As will be described below in greater detail, a controller of the disclosed system may be configured to control a supply of agricultural product through the nozzle assemblies 68 based at least in part on data generated by the sensors 74 indicative of the field conditions relative to the sprayer 10. More particularly, the nozzle assemblies 68 are spaced apart from each other on the boom 28 along a lateral direction 50. Furthermore, fluid conduits (not shown) may fluidly couple the nozzle assemblies 68 to the tank(s) 26. Each nozzle assembly 68 may include a nozzle valve (not shown) and an associated spray tip or spray nozzle (not shown). In several embodiments, the operation of each nozzle valve may be individually controlled by the controller such that the valve regulates the flow rate and/or other spray characteristic of the agricultural product through the associated spray nozzle. Such individual control of the operation of the nozzle valves may be used to selectively spray agricultural product onto a field. For example, such individual control of the operation of the nozzle valves may be used to spray weeds identified or mapped within a field.

Moreover, as will be described in greater detail below, in some embodiments, the nozzle assemblies 68 may be positioned on only one side of the boom 28 (e.g., on the right boom section assembly 34). Alternatively or additionally, nozzle assemblies 68 on one side of the boom 28 (e.g., on the right boom section assembly 34) may be configured to dispense a first product (e.g., a first fluid) and further nozzle assemblies 68 on the other side of the boom 28 (e.g., on the left boom section assembly 32) may be configured to dispense a second product (e.g., a second fluid), where the first and second products are different. Alternatively, each nozzle assembly 68 may be configured to selectively switch between supplying the first product and supplying the second product.

In several embodiments, the disclosed system and method may be executed such that field conditions within a field are detected using sensors 74 associated with a first half or side of the boom 28 of an agricultural sprayer 10 during one pass across the field and thereafter sprayed/treated using nozzle assemblies 68 associated with the other half or side of the boom assembly during a subsequent pass across the field. By sensing with sensors 74 on one side of the sprayer and spraying with nozzle assemblies 68 on the other side of the sprayer based on the data collected by the sensors 74 on a previous pass, the data collected by the sensors 74 may be analyzed to identify field conditions (e.g., weeds) in one part of the field while a spraying operation takes place in an adjacent part of the field, which means that sprayers 10 employing such system may be operated at significantly faster speeds because the sprayers 10 are no longer limited by the processing speed for analyzing the sensor data.

Several example embodiments of work routes for performing a spraying operation according to the present subject matter will be described below. Particularly, FIGS. 4A-4D illustrate a sequence of schematic views in which an agricultural sprayer is shown performing a spraying operation in a field in accordance with one example embodiment of a work route. Additionally, FIGS. 5A-5D and FIGS. 6A-6C illustrate alternate sequences of schematic views in which an agricultural sprayer is shown performing a spraying operation in a field in accordance with another example embodiment of a work route.

Figure 4A:
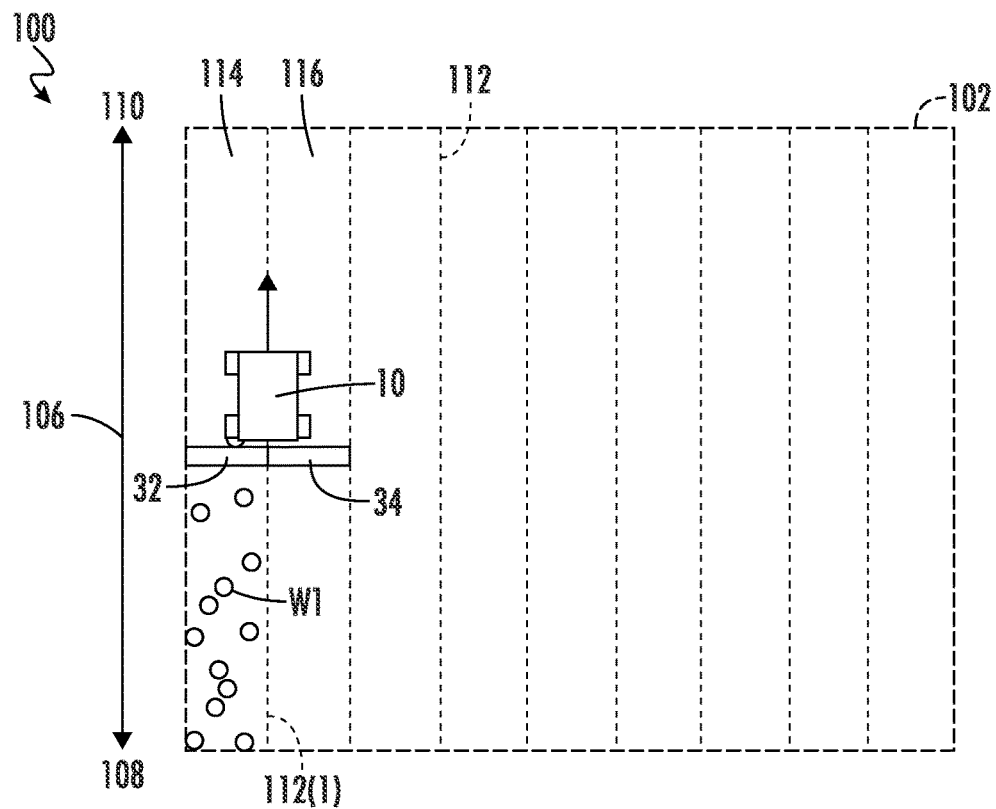
FIGS. 4A-4D illustrate a sequence of schematic views in which an agricultural sprayer is shown performing a spraying operation in a field using one example embodiment of a work route determined in accordance with aspects of the present subject matter.

As shown in the various embodiments illustrated in FIGS. 4A-6C, the field 100 includes a working area 102. The working area 102 extends in an operating direction of the sprayer 10 (indicated by arrows 106) between a first end 108 and a second end 110. Additionally, as shown, a plurality of swath lines 112 extend in the operating direction 106 between the first and second ends 108, 110 of the working area. As is generally understood, the swath lines 112 may correspond to predetermined or pre-generated guidance lines representing anticipated or desired paths or passes across the field 100 for performing an agricultural operation (e.g., spraying operation, and/or the like). Such guidance or swath lines 112 may be stored within the memory of one or more components of the disclosed system. In several embodiments, the route plan developed for the sprayer 10 may be configured such that the boom 28 associated with the sprayer 10 extends over two swaths or portions of the field at a time. For instance, as shown in FIGS. 4A, 5A, and 6A, as the sprayer 10 makes a first pass across the field along a first swath line 112(1), the left boom section assembly 32 extends above a first swath 114 and the right boom section assembly 34 extends above a second swath 116, where the first and second swaths 114, 116 are directly adjacent to one another.

Figure 4B:
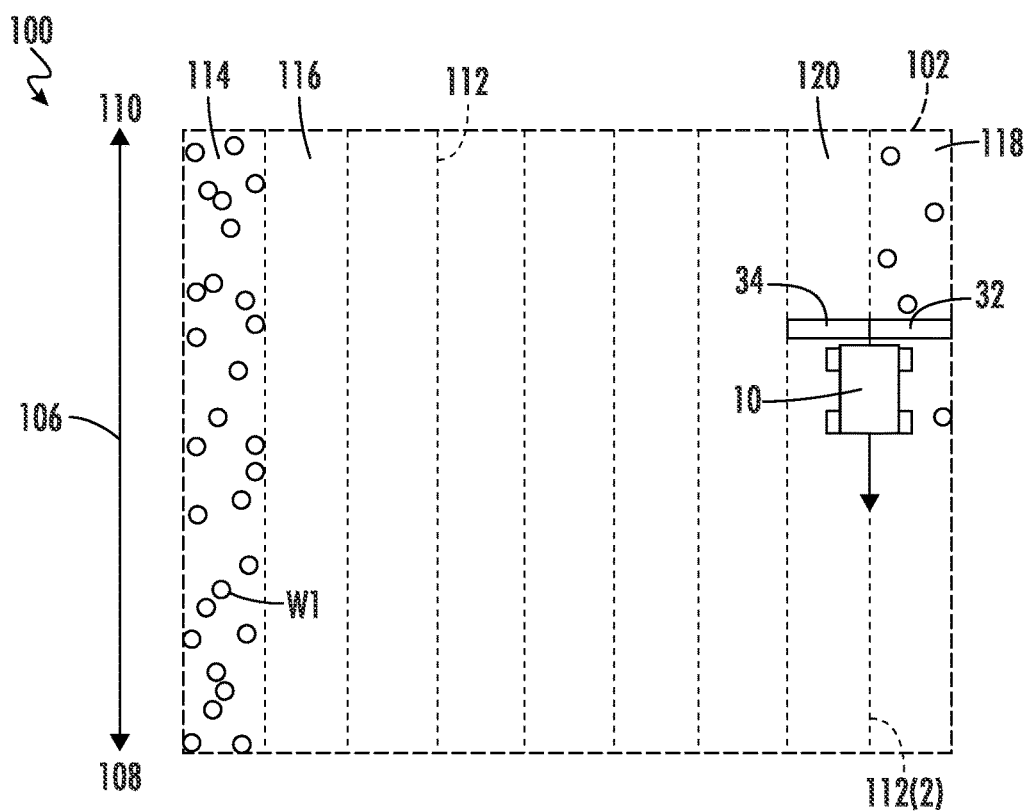

As indicated above, in one embodiment, the sensors 74 may be associated with or installed on one of the boom section assemblies 32, 34 and the nozzle assemblies 68 configured to be controlled based on the sensor data from the sensors 74 may be associated with or installed on the other of the boom section assemblies 32, 34. In such embodiment, the sensors 74 may be configured to detect field conditions (e.g., plants, weeds, etc.) in one swath while the nozzle assemblies 68 are able to spray in another swath based on the sensed field conditions. For example, in the illustrated embodiment shown in FIG. 4A, the left boom section assembly 32 is associated with sensors 74 (not shown) and extends above the first swath 114 within the field as the sprayer 10 makes a first pass across the field along the first swath line 112(1) such that plants (e.g., weeds W1) along the first swath 114 and within the sensor detection zone 76 (FIG. 3) of each sensor 74 are able to be detected and mapped based on data received from the sensors 74. Similarly, as shown in FIG. 4B, the left boom section assembly 32 associated with sensors 74 (not shown) extends above a third swath 118 within the field as the sprayer 10 makes the second pass across the field along a second swath line 112(2) such that plants (e.g., weeds W1) along the third swath 118 and within the sensor detection zone 76 (FIG. 3) of each sensor 74 are able to be detected and mapped based on data received from the sensors 74.

Figure 4C:
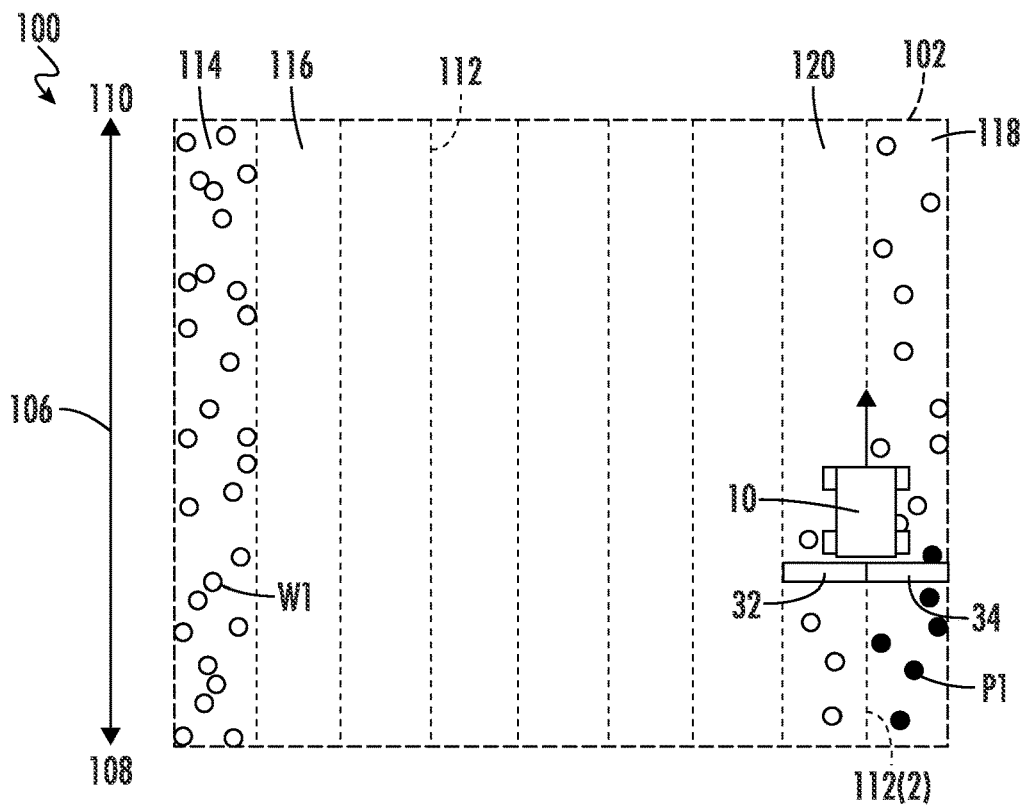
Figure 4D:
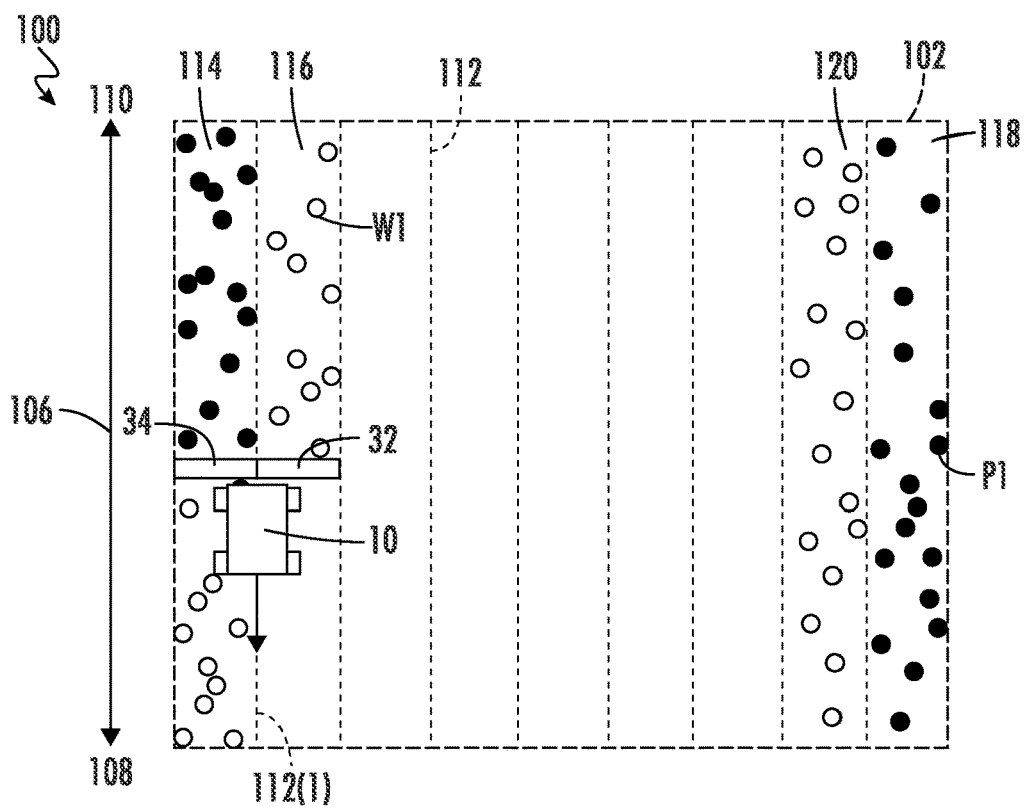

Thereafter, as shown in FIG. 4C, the sprayer 10 makes a third pass across the field along the same swath line as the second pass (e.g., the second swath line 112(2)) such that the left boom section assembly 32 associated with the sensors 74 (not shown) extends over a fourth swath 120 positioned immediately adjacent the third swath 118 while the right boom section assembly 34 associated with nozzle assemblies 68 (not shown) configured to be controlled based on the sensor data from the sensors 74 extends over the mapped third swath 118. As the sprayer 10 makes the third pass, the nozzle assemblies 68 (not shown) may be controlled to selectively spray agricultural product P1 on plants (e.g., weeds W1) identified within the third swath 118 based on the data collected during the second pass, while data simultaneously collected from the sensors 74 (not shown) is being used to detect and map plants (e.g., weeds W1) along the fourth swath 120. Similarly, as shown in FIG. 4D, the sprayer 10 makes a fourth pass across the field along the first swath line 112(1) again such that the left boom section assembly 32 associated with the sensors 74 extends over the second swath 116 and the right boom section assembly 34 associated with the nozzle assemblies 68 (not shown) extends over the previously mapped first swath 114. As the sprayer 10 makes the fourth pass, the nozzle assemblies 68 (not shown) may be controlled to selectively spray agricultural product P1 on plants (e.g., weeds W1) identified within the first swath 114 based on the data collected during the first pass, while data simultaneously collected from the sensors 74 (not shown) is being used to detect and map plants (e.g., weeds W1) along the second swath 116. As such, the sensing side of the sprayer 10 may be used to map the plants located in one swath within a field during one pass across the field and the spraying side of the sprayer 10 may be used to spray the mapped plants (e.g., weeds W1) during a subsequent pass across the field. Additionally, during such subsequent pass, the sensing side of the sprayer may be used to simultaneously map the swath adjacent to the swath being sprayed.

Figure 5A:
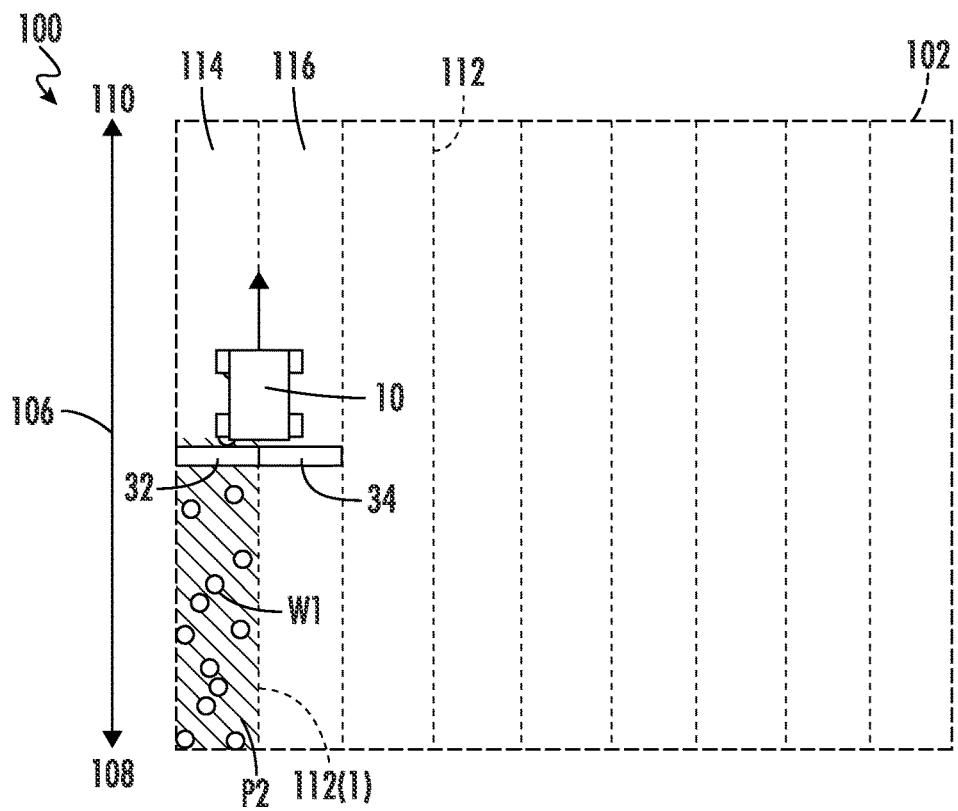
FIGS. 5A-5D illustrate an alternate sequence of schematic views in which an agricultural sprayer is shown performing a spraying operation in a field using another example embodiment of a work route determined in accordance with aspects of the present subject matter.
Figure 5B:
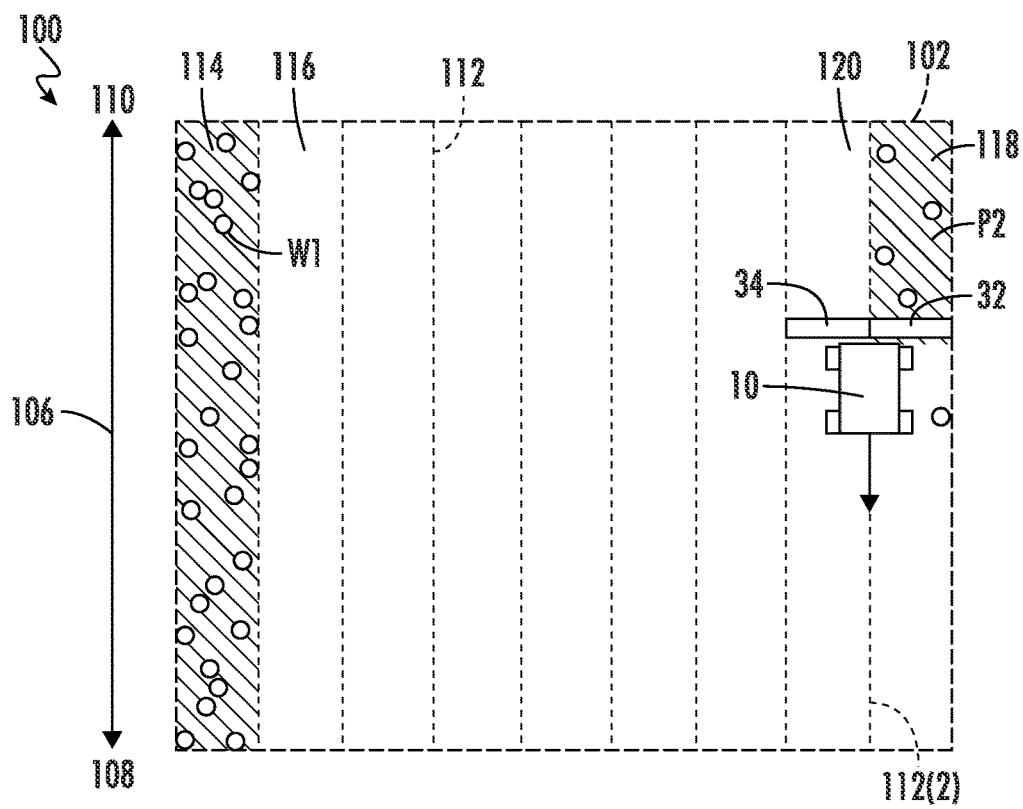
Figure 5C:
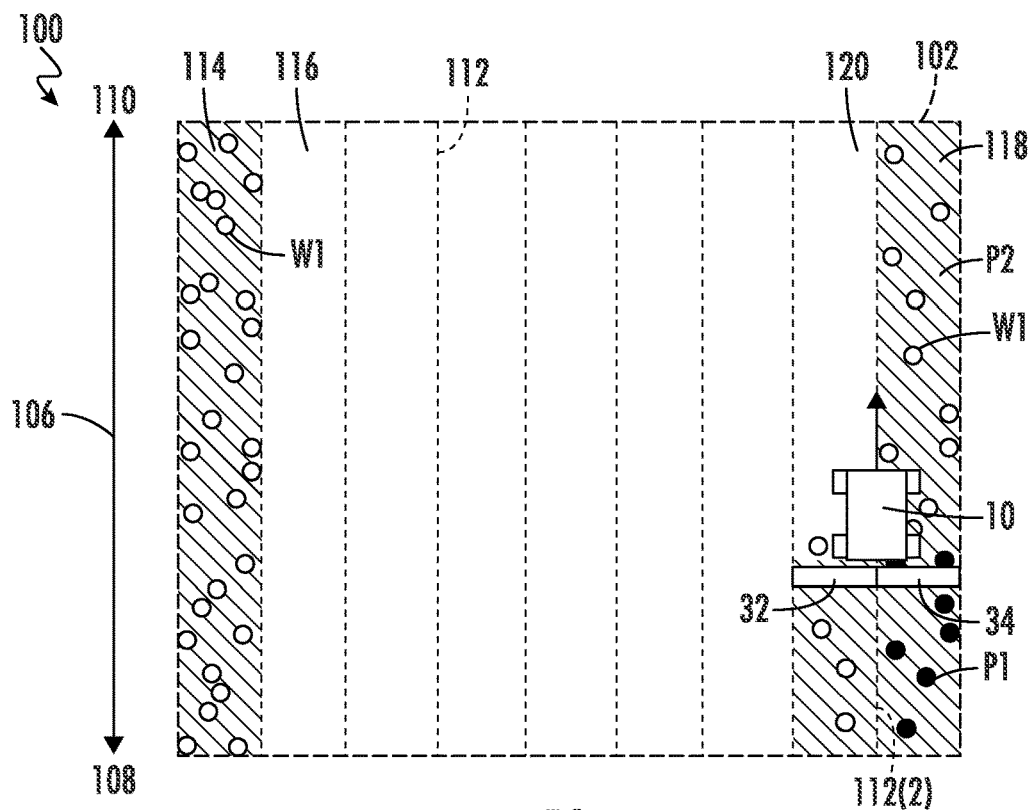
Figure 5D:
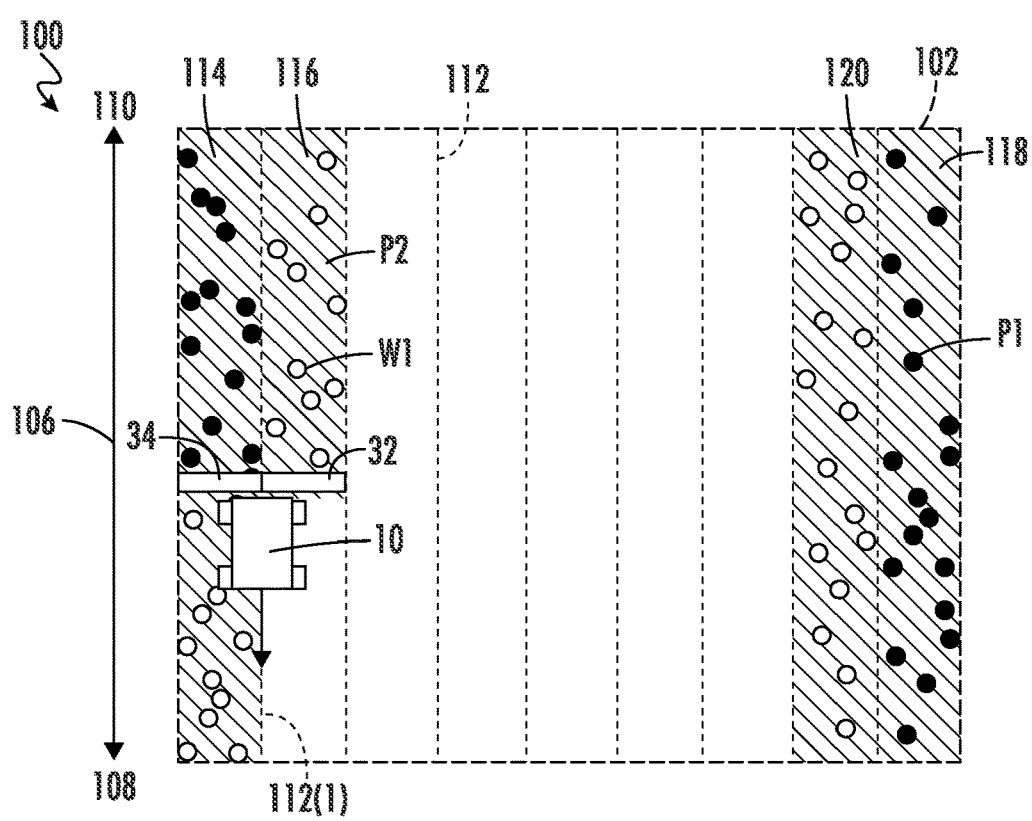

Further, in some embodiments, the nozzle assemblies 68 positioned on the sensing side of the sprayer 10 may be configured to continuously spray a product along a swath while the sensors 74 detect field conditions (e.g., plants, weeds, etc.) in the same swath and while the nozzle assemblies 68 associated with the other side of the sprayer 10 are used to selectively spray previously mapped plants in the adjacent swath. For example, FIGS. 5A-5D are substantially the same as FIGS. 4A-4D, except that the nozzle assemblies 68 (not shown) on the left boom section assembly 32 are now used. As such, plants (e.g., weeds W1) along the one swath (e.g., first swath 114 in FIG. 5A, third swath 118 in FIG. 5B, fourth swath 120 in FIG. 5C, second swath 116 in FIG. 5D) are able to be detected and mapped based on data received from the sensors 74 while a second agricultural product P2 is dispensed (e.g., continuously) across the same swath by the nozzle assemblies 68 associated with the left boom section assembly 32. Further, as shown in FIGS. 5C and 5D, the nozzle assemblies 68 associated with the right boom section assembly 34 are able to spray the plants (e.g., weeds W1) previously detected with the first agricultural product P1 while the second agricultural product P2 is being dispensed by the nozzle assemblies 68 associated with the left boom section assembly 32.

As indicated above, the nozzle assemblies 68 associated with different sides of the sprayer 10 may be separately supplied the first agricultural product P1 or the second agricultural product P2, respectively. For instance, a controller of the disclosed system may be configured to control a right boom valve (not shown) associated with the right boom section assembly 34 to selectively supply the first agricultural product P1 from a first one of the fluid tanks 26 to the nozzle assemblies 68 of the right boom section assembly 34. Similarly, the controller of the disclosed system may be configured to control a left boom valve (not shown) associated with the left boom section assembly 32 to selectively supply the second agricultural product P2 from another one of the fluid tanks 26 to the nozzle assemblies 68 of the left boom section assembly 32.

Figure 6A:
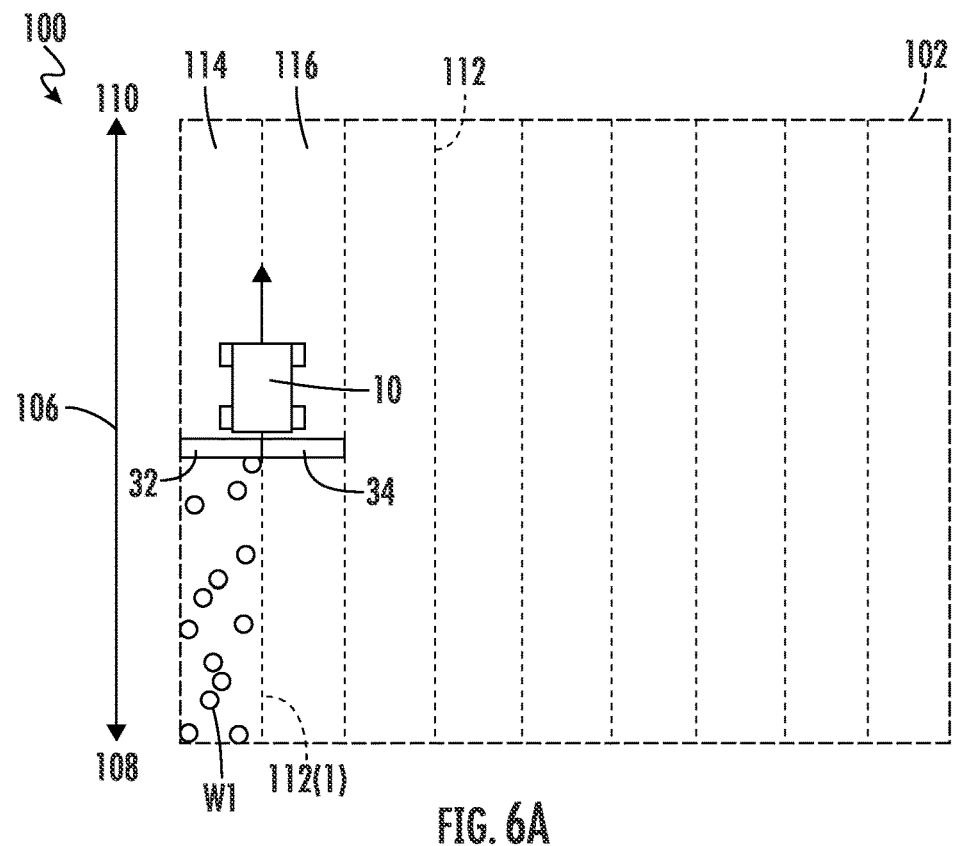
FIGS. 6A-6C illustrate another alternate sequence of schematic views in which an agricultural sprayer is shown performing a spraying operation in a field using a further example embodiment of a work route determined in accordance with aspects of the present subject matter.
Figure 6B:
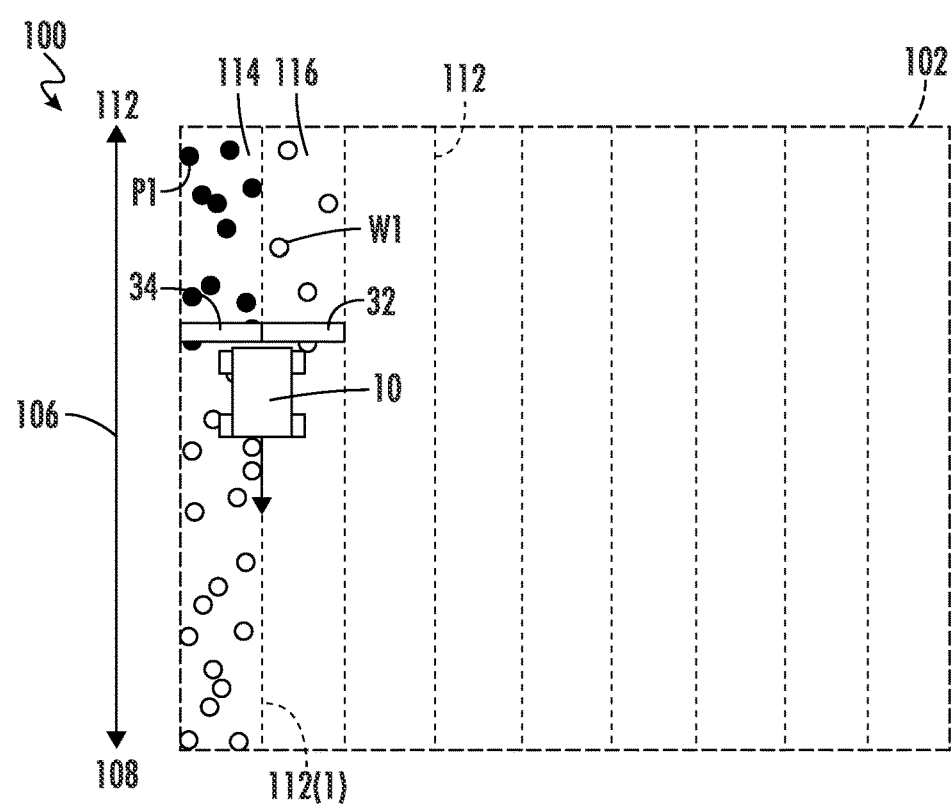

Alternatively, in some embodiments, sensors 74 may be installed across the entire boom 28 of the sprayer 10. In such embodiment, the side of the sprayer 10 that functions to initially detect field conditions and the side of the sprayer 10 that initially functions to treat the previously detected field conditions may periodically switch. For example, in the embodiment shown in FIGS. 6A-6C, both sides of the sprayer 10 are associated with nozzle assemblies 68 and sensors 74. For instance, as shown in FIGS. 6A and 6B, during the first two passes across the field along the first swath line 112(1), data collected from the sensors 74 (not shown) associated with the left boom section assembly 32 is used to detect plants (e.g., weeds W1) within the first and second swaths 114, 116 while the sensors 74 (not shown) associated with the right boom section assembly 34 are not used. Similarly, as shown in FIG. 6B, the nozzles assemblies 68 (not shown) associated with the right boom section assembly 34 are used during the second pass along the first swath line 112(1) to spray the plants (e.g., weeds W1) detected within the first swath 114 while the nozzle assemblies 68 (not shown) associated with the left boom section assembly 32 are not used to spray.

Figure 6C:
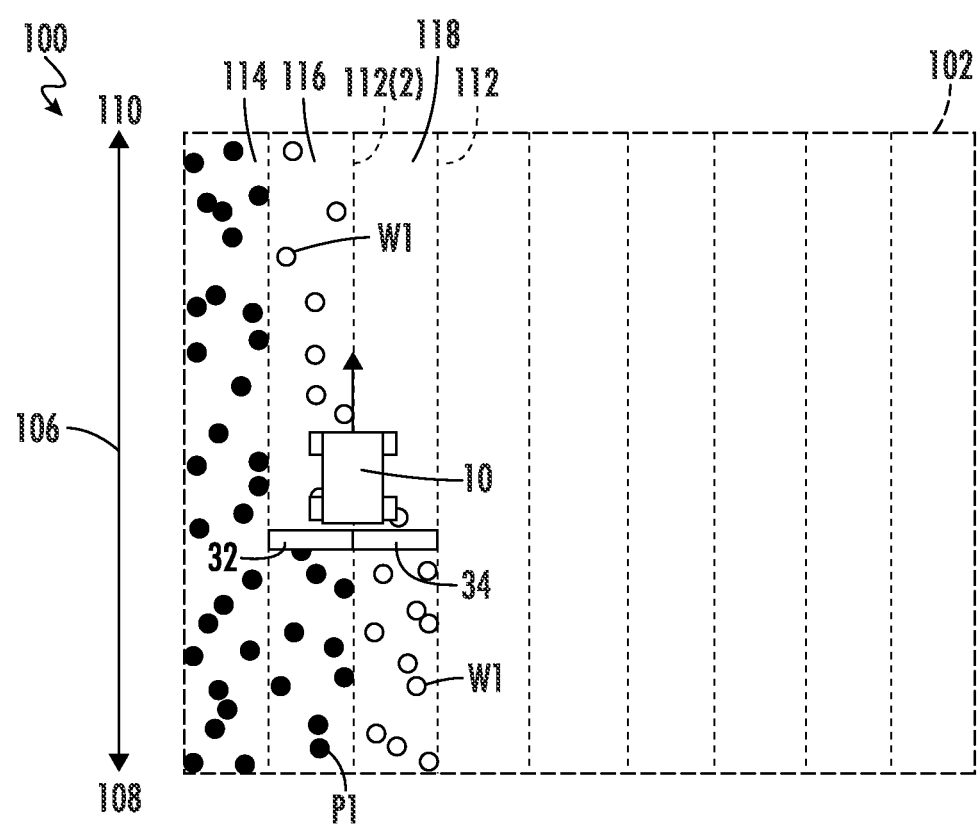

Thereafter, as shown in FIG. 6C, the operation of the nozzle assemblies 68 and sensors 74 associated with the two sides of the sprayer 10 switch such that the sensors 74 (not shown) associated with the right boom section assembly 34 are then used to collect data during a third pass across the field along the second swath line 112(2) indicative of plants (e.g., weeds W1) within a third swath 118 (instead of the sensors 74 (not shown) associated with the left boom section assembly 32). Similarly, the nozzle assemblies 68 (not shown) associated with the left boom section assembly 32 are then used during the third pass to spray the plants (e.g., weeds W1) previously detected within the second swath 116 (instead of the nozzle assemblies 68 (not shown) associated with the right boom section assembly 34).

It should be appreciated that with such embodiment, the nozzle assemblies 68 associated with the left and right boom section assemblies 32, 34 may further be configured to switch between selectively spraying previously identified plants and continuously spraying swaths. For instance, similar to that described above with reference to FIGS. 5A-5D, the nozzle assemblies 68 associated with one of the boom section assemblies 32, 34 may be configured to continuously spray a product (e.g., product P2) across a swath while the sensors 74 of such boom section assembly 32, 34 are being used to collect data indicative of the field conditions within that swath. The same nozzle assemblies 68 may be switched to selectively spray another product (e.g., product P1) onto identified plants (e.g., weeds W1) within a swath while the sensors 74 of the other boom section assembly 32, 34 are being used to collect data indicative of field conditions within an adjacent swath.

It should be appreciated that in any of the embodiments described above, swaths that have little to no weeds detected based on a first pass across the swath may not require a second pass across the swath. For instance, a weed presence threshold indicative of a number of weeds (e.g., based on a number of individual weeds, a coverage area of weeds, a density of weeds, etc.) above which a spraying operation is necessary may be predetermined and stored within a controller of the disclosed system. The number of weeds detected based on the data collected during a first pass across a swath may be compared to the stored weed presence threshold. If the number of weeds detected across the swath exceeds the weed presence threshold, the swath requires a spraying operation to take place, and the generated work route of the sprayer 10 includes a second pass over the swath for performing the spraying operation in the swath similar to as shown in FIGS. 4A-6C. If the number of weeds across the swath is equal to or below the weed presence threshold, a spraying operation does not need to take place in the swath, and the work route of the sprayer 10 is adjusted such that the swath is not passed over again during a subsequent pass. As such, the time for performing a spraying operation within a field may be reduced.

Figure 7:
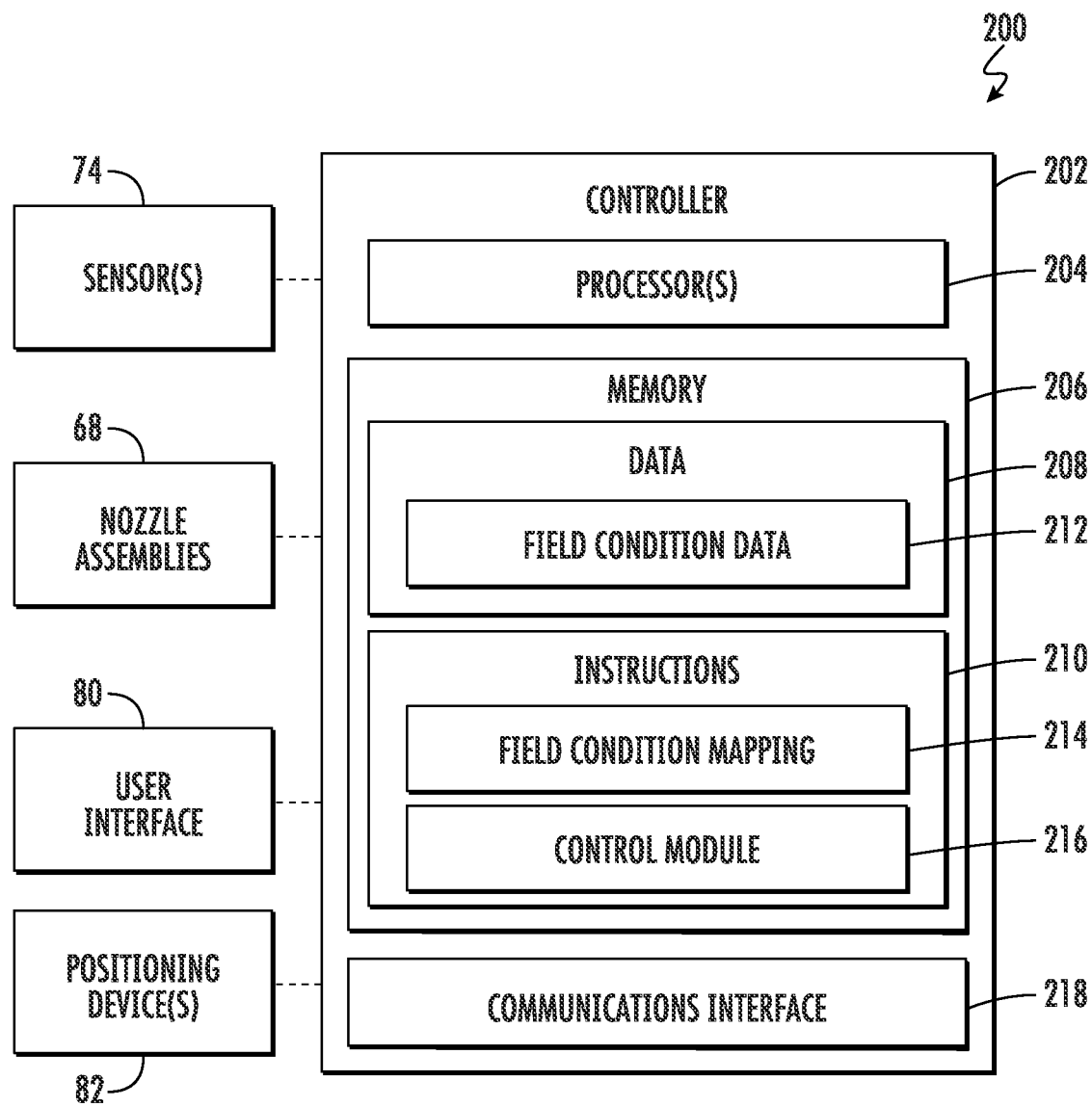
FIG. 7 illustrates a schematic view of one embodiment of a system for performing spraying operations with an agricultural sprayer in accordance with aspects of the present subject matter.

Referring now to FIG. 7, a schematic view of a system 200 for performing spraying operations with an agricultural sprayer is illustrated in accordance with aspects of the present subject matter. In general, the system 200 will be described herein with reference to the sprayer 10 described above with reference to FIGS. 1-3, as well as the route options described above with reference to FIGS. 4A-6C. However, it should be appreciated by those of ordinary skill in the art that the disclosed system 200 may generally be utilized with sprayers having any suitable sprayer configuration, and/or with any other suitable route options. Additionally, it should be appreciated that, for purposes of illustration, communicative links or electrical couplings of the system 200 shown in FIG. 7 are indicated by dashed lines.

In several embodiments, the system 200 may include a controller 202 and various other components configured to be communicatively coupled to and/or controlled by the controller 202, such as one or more sensors 74 configured to detect field conditions of a swath within a field, one or more nozzle assemblies 68 configured to be controlled based on such field conditions, a user interface (e.g., user interface 80), and one or more positioning devices 82. The user interface 80 described herein may include, without limitation, any combination of input and/or output devices that allow an operator to provide operator inputs to the controller 202 and/or that allow the controller 202 to provide feedback to the operator, such as a keyboard, keypad, pointing device, buttons, knobs, touch sensitive screen, mobile device, audio input device, audio output device, and/or the like. In some embodiments, the positioning device 82 may be configured as a satellite navigation positioning device (e.g. a GPS system, a Galileo positioning system, a Global Navigation satellite system (GLONASS), a BeiDou Satellite Navigation and Positioning system, a dead reckoning device, and/or the like) to determine the location of the sprayer 10 and/or the boom 28.

In general, the controller 202 may correspond to any suitable processor-based device(s), such as a computing device or any combination of computing devices. Thus, as shown in FIG. 7, the controller 202 may generally include one or more processor(s) 204 and associated memory devices 206 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 206 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 206 may generally be configured to store information accessible to the processor(s) 204, including data 208 that can be retrieved, manipulated, created and/or stored by the processor(s) 204 and instructions 210 that can be executed by the processor(s) 204.

It should be appreciated that the controller 202 may correspond to an existing controller for the sprayer 10 or may correspond to a separate processing device. For instance, in one embodiment, the controller 202 may form all or part of a separate plug-in module that may be installed in operative association with the sprayer 10 to allow for the disclosed system and method to be implemented without requiring additional software to be uploaded onto existing control devices of the sprayer 10.

In several embodiments, the data 208 may be stored in one or more databases. For example, the memory 206 may include a field condition database 212 for storing field condition data received from the sensors(s) 74 and/or the positioning device(s) 82. For instance, the plant-identifying sensor(s) 74 may be configured to continuously, periodically, or otherwise capture data associated with a portion of the field, such as during a pass within the field as described above with reference to FIGS. 4A-6C. In such an embodiment, the data transmitted to the controller 202 from the plant-identifying sensor(s) 74 may be stored within the field condition database 212 for subsequent processing and/or analysis. It should be appreciated that, as used herein, the term "field condition data" may include any suitable type of data received from the sensor(s) 74 that allows for the field condition (e.g., plants, weeds, etc.) of a field to be analyzed, including photographs or other images, RADAR data, LIDAR data, and/or other image-related data (e.g., scan data and/or the like). Further, data from the position device(s) 82 may be received simultaneously with the data from the sensor(s) 74 and stored in association with such data from the sensor(s) 74 for later use in geolocating plants within the field as will be described below.

In some embodiments, the instructions 210 stored within the memory 206 of the controller 202 may be executed by the processor(s) 204 to implement a field condition mapping module 214. In general, the field condition mapping module 214 map be configured to assess the field condition data 212 deriving from the sensor(s) 74 and associated position data from the position device(s) 82 and geo-locate detected field conditions within the field. In one embodiment, the field condition(s) may include the presence of weeds or other undesirable or non-useful plants. As such, in one embodiment, as the sprayer 10 travels across the field, the controller 202 may be configured to receive sensor data (e.g., image data) associated with plants within the field from the sensors 74 (e.g., plant-identifying sensor(s)). For instance, as indicated above, in one embodiment, data may be captured from sensor(s) 74 associated with a boom section assembly (e.g., left boom section assembly 32) extending from one side (e.g., left side) of the sprayer 10 above a swath within the field (e.g., first swath 114 in FIG. 4A) indicative of field conditions (e.g., weeds W1 in FIG. 4A) within the swath.

Thereafter, the controller 202 may configured to analyze/process the received image data to detect/identify the type and location of plants. In this regard, the controller 202 may include any suitable image processing algorithms stored within its memory 206 or may otherwise use any suitable image processing techniques to determine, for example, the presence and locations of weeds within the field based on the received sensor data. For instance, in some embodiments, the controller 202 may be able to directly distinguish between weeds and emerging/standing crops. However, in some embodiments, the controller 202 may be configured indirectly distinguish between weeds and emerging/standing crops, such as by identifying crop rows of emerging/standing crops and then inferring that plants positioned between adjacent crop rows are weeds. Such field condition map may subsequently be used as, or used to generate, a prescription map for controlling the nozzle assemblies 68.

The instructions 210 stored within the memory 206 of the controller 202 may further be executed by the processor(s) 204 to implement a control module 216. The control module 216 may generally be configured to perform a control action based on the monitored field condition. In several embodiments, the control action includes controlling the operation of one or more of the nozzle assemblies 68 to spray a product (e.g., product P1) on plants identified during a previous pass across the field. As indicated above, the nozzle assemblies 68 controlled based on the mapped field conditions (e.g., weeds) may, for example, be associated with the boom section assembly (e.g., right boom section assembly 34) opposite the boom section assembly (e.g., left boom section assembly 32) on which the sensor(s) 74 are installed for detecting/identifying such field conditions. Further, in some embodiments, one or more nozzle assemblies 68 installed in a boom section assembly may be controlled to continuously spray another product (e.g., product P2) on a swath of the field while the sensor(s) 74 of such boom section assembly detect field conditions associated with the swath. Moreover, in some embodiments, the control action may include controlling the operation of the user interface 80 to display to an operator the field map generated by the field condition mapping module 214, the progress of the spraying operation within the field, and/or the like.

It should be appreciated that the actual application of product within the field may not always match the prescribed application. As such, in some embodiments, the memory 206 may further include a post-application database (not shown) for storing application data received from the nozzle assemblies 68, the positioning device(s) 82, application sensor(s) (not shown), and/or the like. For instance, the nozzle assemblies 68, positioning device(s) 82, application sensor(s), and/or the like may be configured to continuously, periodically, or otherwise capture data associated with the actual application of product across a portion of the field, such as during a pass within the field as described above with reference to FIGS. 4B-6C. The data collected from the nozzle assemblies 68, positioning device(s) 82, application sensor(s), etc. may generally be indicative of application errors, such as plugged nozzles, operating conditions beyond normal spraying conditions, such as vehicle speed being above a spraying threshold, the vehicle deviating from a planned path, and/or the like. In such an embodiment, the application data transmitted to the controller 202 from the nozzle assemblies 68, positioning device(s) 82, the application sensor(s), and/or the like may be stored within the post-application database for subsequent processing and/or analysis. It should be appreciated that, as used herein, the term "application data" may include any suitable type of data. Similarly, the application sensor(s) may include any suitable type of sensor.

In some embodiments, the instructions 210 stored within the memory 206 of the controller 202 may be executed by the processor(s) 204 to implement an application mapping module (not shown). In general, the application mapping module map be configured to assess the application data deriving from the nozzle assemblies 68 or application sensor(s) and associated position data from the position device(s) 82 and geo-locate the application conditions within the field. In one embodiment, as the sprayer 10 travels across the field, the controller 202 may be configured to receive data (e.g., image data, pressure data, etc.) associated with the actual application of agricultural product across the field. Thereafter, the controller 202 may configured to analyze/process the received image data to detect/identify the actual application coverage of the field. In this regard, the controller 202 may include any suitable processing algorithms stored within its memory 206 or may otherwise use any suitable image processing techniques to determine, for example, the actual application of product within the field based on the received application data. The actual application map may then be compared to the prescribed map to determine if further action is necessary (e.g., cleaning plugged nozzles, re-spraying certain swath portions, etc.).

Referring back to FIG. 7, the controller 202 may also include a communications interface 218 to provide a means for the controller 202 to communicate with any of the various other system components described herein. For instance, one or more communicative links or interfaces (e.g., one or more data buses) may be provided between the communications interface 218 and the sensor(s) 74 to allow data transmitted from the sensor(s) 74 to be received by the controller 202. Similarly, one or more communicative links or interfaces (e.g., one or more data buses) may be provided between the communications interface 218 and the nozzle assemblies 68 (e.g., electronic valves associated with the nozzle assemblies 68) to control the spraying operation of the nozzle assemblies 68. Additionally, in some embodiments, one or more communicative links or interfaces (e.g., one or more data buses) may be provided between the communications interface 218 and the user interface 80 to present the field map generated by the field condition mapping module 214 to the operator.

Figure 8:
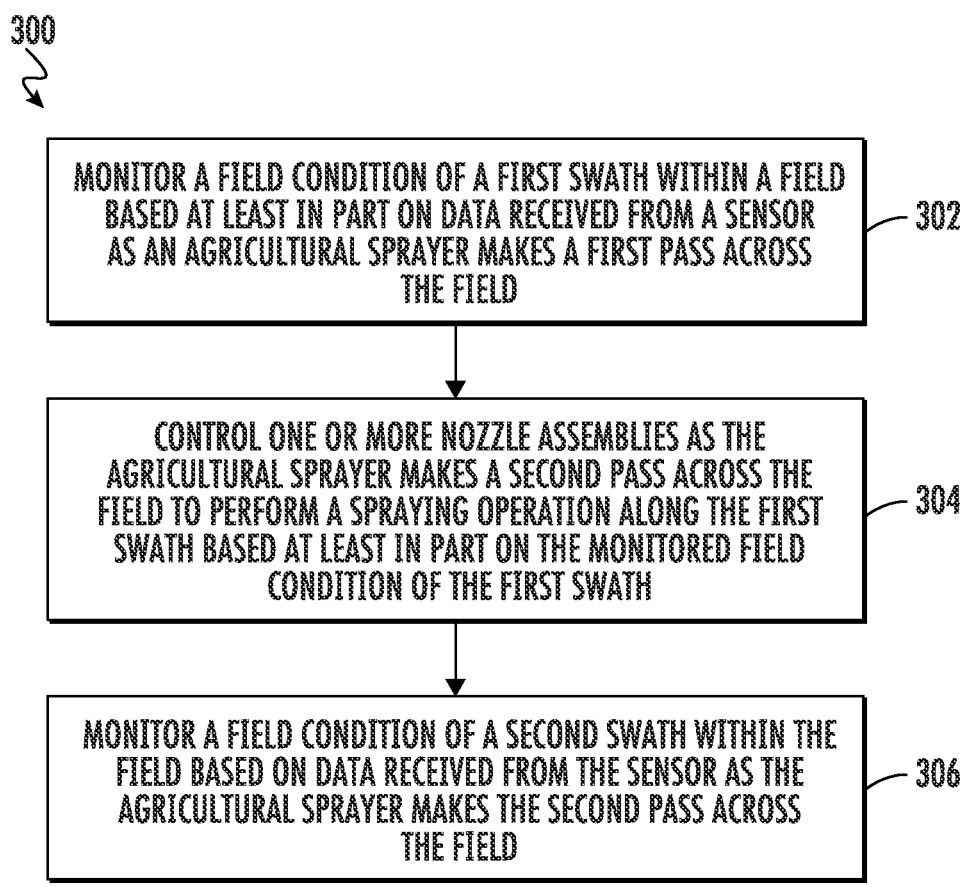
FIG. 8 illustrates a method for performing spraying operations with an agricultural sprayer in accordance with aspects of the present subject matter.

Referring now to FIG. 8, a flow diagram of one embodiment of a method 300 for performing spraying operations with an agricultural sprayer is illustrated in accordance with aspects of the present subject matter. In general, the method 300 will be described herein with reference to the sprayer 10 described above with reference to FIGS. 1-3, the example work route embodiments shown in FIGS. 3A-6C, and the system 200 described above with reference to FIG. 7. However, it should be appreciated that the disclosed method 300 may be implemented with systems having any other suitable system configuration and/or in connection with any other suitable work routes. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (302), the method 300 may include monitoring a field condition of a first swath within a field based at least in part on data received from a sensor as an agricultural sprayer makes a first pass across the field. For instance, as described above, the controller 202 may be configured to receive and analyze data from sensors 74 installed on or otherwise associated with a given boom section assembly (e.g., left boom section assembly 32) as the sprayer 10 makes a first pass across the field to monitor field conditions associated with a first swath of the field, such as by identifying the locations of plants within the field that require selective application of an agricultural product or fluid, within the swath.

Further, at (304), the method 300 may include controlling one or more nozzle assemblies as the agricultural sprayer makes a second pass across the field to perform a spraying operation along the first swath based at least in part on the monitored field condition of the first swath. For example, as described above, the controller 202 may be configured to control the operation of nozzle assemblies 68 associated with the opposed boom section assembly (e.g., right boom section assembly 34) as the sprayer 10 makes a second pass across the field to perform a spraying operation along the swath based at least in part on the previously monitored field condition (e.g., weeds).

Additionally, at (306), the method 300 may include monitoring a field condition of a second swath within the field based on data received from the sensor as the agricultural sprayer makes the second pass across the field. For instance, as indicated above, while the "spraying" side of the boom 28 is being used to selectively spray the previously mapped plants of one swath, the controller 202 may be configured to receive and analyze data from the sensor(s) 74 installed on the "sensing" side of the boom 28 that is associated with corresponding field conditions (e.g., weeds) within an adjacent swath.

It is to be understood that the steps of the method 300 are performed by the computing system 200 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 200 described herein, such as the method 300, is implemented in software code or instructions which are tangibly stored on a tangible computer readable medium. The computing system 200 loads the software code or instructions via a direct interface with the computer readable medium or via a wired and/or wireless network. Upon loading and executing such software code or instructions by the computing system 200, the computing system 200 may perform any of the functionality of the computing system 200 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for performing spraying operations, the method comprising:
    monitoring, with a computing device, a field condition of a first swath within a field based at least in part on data received from a sensor as an agricultural sprayer makes a first pass across the field, the agricultural sprayer including a first boom section assembly and a second boom section assembly extending therefrom, the first boom section assembly extending above at least a portion of the first swath during the first pass, the sensor being provided in association with the first boom section assembly;
    controlling, with the computing device, one or more nozzle assemblies of the agricultural sprayer as the agricultural sprayer makes a second pass across the field to perform a spraying operation along the first swath based at least in part on the monitored field condition of the first swath, the one or more nozzle assemblies being provided in association with the second boom section assembly;
    monitoring, with the computing device, a field condition of a second swath within the field based on data received from the sensor as the agricultural sprayer makes the second pass across the field, the first boom section assembly extending above at least a portion of the second swath during the second pass.

2. The method of claim 1, wherein monitoring the field condition comprises identifying locations of plants within the field that require selective application of an agricultural fluid via execution of the spraying operation.

3. The method of claim 2, further comprising generating a field map based at least in part on the data received from the sensor, the field map geo-locating the identified plants along the first swath and the second swath based on the data received from the sensor.

4. The method of claim 3, further comprising controlling a user interface to display the field map.

5. The method of claim 3, wherein controlling the one or more nozzle assemblies as the agricultural sprayer makes the second pass across the field to perform the spraying operation along the first swath comprises controlling the one or more nozzle assemblies as the agricultural sprayer makes the second pass across the field to selectively apply the agricultural fluid to the identified plants along the first swath based on the field map.

6. The method of claim 2, wherein monitoring the field condition of the first swath comprises identifying the locations of weeds within the first swath based on the data received from the sensor as the agricultural sprayer makes the first pass, and
    wherein controlling the one or more nozzle assemblies of the agricultural sprayer comprises controlling the one or more nozzle assemblies to spray the weeds within the first swath as the agricultural sprayer makes the second pass based at least in part on the identified locations of the weeds within the first swath.

7. The method of claim 1, wherein the first and second swaths are directly adjacent to one another, and
    wherein the first boom section assembly extends above the second swath and the second boom section assembly extends above the first swath during the second pass.

8. The method of claim 1, wherein the sensor comprises a plant-identifying sensor configured to capture images of the field.

9. The method of claim 7, wherein the sensor is coupled to the first boom section assembly such that the sensor has a sensor detection zone encompassing at least a portion of the first swath during the first pass and encompassing at least a portion of the second swath during the second pass.

10. The method of claim 1, further comprising:
    controlling, with the computing device, one or more further nozzle assemblies of the agricultural sprayer as the agricultural sprayer makes a third pass across the field to perform a spraying operation along the second swath based at least in part on the monitored field condition of the second swath, the one or more further nozzle assemblies being provided in association with the first boom section assembly;
    monitoring, with the computing device, a field condition of a third swath within the field based on data received from a second sensor as the agricultural sprayer makes the third pass across the field, the second sensor being provided in association with the second boom section assembly, the second boom section assembly extending above at least a portion of the third swath during the third pass.

11. The method of claim 1, further comprising controlling, with the computing device, one or more further nozzle assemblies as the agricultural sprayer makes the first pass across the field to perform a continuous spraying operation along the first swath with a first fluid, the one or more further nozzle assemblies being provided in association with the first boom section assembly, wherein controlling the one or more nozzle assemblies as the agricultural sprayer makes the second pass across the field to perform the spraying operation along the first swath comprises controlling the one or more nozzle assemblies as the agricultural sprayer makes the second pass across the field to selectively dispense a second fluid based at least in part on the monitored field condition of the first swath, the second fluid differing from the first fluid.

12. A system for performing spraying operations, the system comprising:

a sprayer boom comprising a first boom section assembly extending outwardly along a first side of the sprayer boom, and a second boom section assembly extending outwardly along a second side of the sprayer boom, the second side being opposite the first side;

a sensor provided in association with the first boom section assembly, the sensor being configured to detect a parameter indicative of a field condition within a portion of the field;

one or more nozzle assemblies provided in association with the second boom section assembly; and a controller communicatively coupled to the sensor, the controller comprising a processor and a memory, the memory being configured to store instructions that, when executed by the processor, configure the controller to:

monitor the field condition of a first swath based at least in part on sensor data received from the sensor as an agricultural sprayer makes a first pass within the field, control the one or more nozzle assemblies as the agricultural sprayer makes a second pass across the field to perform a spraying operation within the first swath based at least in part on the monitored field condition of the first swath, and monitor the field condition of a second swath based at least in part on sensor data received from the sensor as the agricultural sprayer makes the second pass.

13. The system of claim 12, wherein the portion of the field comprises at least a portion of the first swath as the agricultural sprayer makes the first pass within the field, and wherein the portion of the field comprises at least a portion of the second swath as the agricultural sprayer makes the second pass within the field.

14. The system of claim 12, wherein the first and second swaths are directly adjacent to one another, wherein the first boom section assembly extends above the second swath and the second boom section assembly extends above the first swath during the second pass.

15. The system of claim 12, further comprising a user interface, wherein the controller is further configured to control the user interface to display a field map generated based at least in part on the data received from the sensor.

16. The system of claim 12, wherein the sensor comprises a plant-identifying sensor, the controller being further configured to monitor the field condition to identify locations of plants within the field that require selective application of an agricultural fluid via execution of the spraying operation.

17. The system of claim 16, wherein the controller is further configured to generate a field map based at least in part on the data received from the sensor, the field map geo-locating the identified plants along the first swath and the second swath based on the data received from the sensor.

18. The system of claim 17, wherein the controller is configured to control the one or more nozzle assemblies as the agricultural sprayer makes the second pass across the field to selectively apply the agricultural fluid to the identified plants along the first swath based on the field map.

19. The system of claim 12, wherein the controller is further configured to:

control one or more further nozzle assemblies of the agricultural sprayer as the agricultural sprayer makes a third pass across the field to perform a spraying operation along the second swath based at least in part on the monitored field condition of the second swath, the one or more further nozzle assemblies being provided in association with the first boom section assembly, and monitor a field condition of a third swath within the field based on data received from a second sensor as the agricultural sprayer makes the third pass across the field, the second sensor being provided in association with the second boom section assembly, the second boom section assembly extending above at least a portion of the third swath during the third pass.

20. The system of claim 12, wherein the controller is further configured to control one or more further nozzle assemblies as the agricultural sprayer makes the first pass across the field to perform a continuous spraying operation along the first swath with a first fluid, the one or more further nozzle assemblies being provided in association with the first boom section assembly, wherein controlling the one or more nozzle assemblies as the agricultural sprayer makes the second pass across the field to perform the spraying operation along the first swath comprises controlling the one or more nozzle assemblies as the agricultural sprayer makes the second pass across the field to selectively dispense a second fluid based at least in part on the monitored field condition of the first swath, the second fluid differing from the first fluid.

* * * * *